(12) United States Patent
Lee

(10) Patent No.: US 9,969,340 B2
(45) Date of Patent: May 15, 2018

(54) APPARATUS FOR DUALLY DISPLAYING DISTANCE TO EMPTY OF AUTONOMOUS VEHICLE AND DISPLAY METHOD USING THE SAME

(71) Applicant: HYUNDAI MOTOR COMPANY, Seoul (KR)

(72) Inventor: Kang-Ho Lee, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/355,591

(22) Filed: Nov. 18, 2016

(65) Prior Publication Data

US 2018/0056900 A1    Mar. 1, 2018

(30) Foreign Application Priority Data

Aug. 23, 2016 (KR) .................. 10-2016-0106657

(51) Int. Cl.
| | |
|---|---|
| *B60R 16/023* | (2006.01) |
| *G05D 1/00* | (2006.01) |
| *G06N 99/00* | (2010.01) |
| *G06N 5/04* | (2006.01) |
| *B60W 40/09* | (2012.01) |

(52) U.S. Cl.
CPC ......... *B60R 16/0236* (2013.01); *B60W 40/09* (2013.01); *G05D 1/0088* (2013.01); *G06N 5/04* (2013.01); *G06N 99/005* (2013.01)

(58) Field of Classification Search
CPC ..... B60R 16/0236; B60W 40/09; G06N 5/04; G06N 99/005; G05D 1/0088; B60L 2260/52
See application file for complete search history.

(56) References Cited

U.S. PATENT DOCUMENTS

| | | | | |
|---|---|---|---|---|
| 8,860,565 | B2* | 10/2014 | Skaff ...................... | B60K 35/00 340/425.5 |
| 2011/0112710 | A1 | 5/2011 | Meyer-Ebeling et al. | |
| 2015/0051825 | A1* | 2/2015 | Saavedra ................ | G01F 9/023 701/123 |
| 2015/0185063 | A1* | 7/2015 | Lee ......................... | G01F 9/023 701/123 |
| 2015/0369619 | A1* | 12/2015 | Kim ................... | G01C 21/3469 701/22 |
| 2016/0023554 | A1* | 1/2016 | Tseng ...................... | B60L 3/12 701/22 |

FOREIGN PATENT DOCUMENTS

| | | |
|---|---|---|
| JP | 2003-166868 A | 6/2003 |
| JP | 2011-240816 A | 12/2011 |
| JP | 2013-158111 A | 8/2013 |
| JP | 2014-101103 A | 6/2014 |
| KR | 10-2003-0024378 A | 3/2003 |
| KR | 10-2013-0051132 A | 5/2013 |
| KR | 10-1518918 B1 | 5/2015 |

* cited by examiner

*Primary Examiner* — Michael J Zanelli
(74) *Attorney, Agent, or Firm* — McDermott Will & Emery LLP

(57) ABSTRACT

A method of displaying autonomous driving mode distance to empty (DTE) of a vehicle capable of autonomous driving includes: determining whether a destination is set; reading a preset gas mileage table; calculating in real time an autonomous driving condition factor to the destination; calculating the autonomous driving mode DTE based on the preset gas mileage table and the autonomous driving condition factor; and displaying the calculated autonomous driving mode DTE.

12 Claims, 4 Drawing Sheets

APPARATUS FOR DUALLY DISPLAYING DISTANCE TO EMPTY OF AUTONOMOUS VEHICLE AND DISPLAY METHOD USING THE SAME

CROSS-REFERENCE(S) TO RELATED APPLICATIONS

This application claims the benefit of priority to Korean Patent Application No. 10-2016-0106657, filed on Aug. 23, 2016, which is incorporated herein by reference in its entirety.

TECHNICAL FIELD

The present disclosure relates to an apparatus for displaying distance to empty (DTE) of an autonomous vehicle and a method therefor, and particularly, to an apparatus for dually displaying DTE of an autonomous vehicle which dually calculates DTEs in a driver driving mode and an autonomous driving mode and visually displays the respective results, thus enabling a driver to select the driving mode as needed, and a method therefor.

BACKGROUND

In general, a cluster for a vehicle displays a speed and mileage of the vehicle. Recently, the distance that the vehicle can travel is calculated based on the amount of remaining fuel and is displayed as distance to empty (DTE).

A method of displaying the DTE according to a conventional art includes detecting the amount of fuel remaining in a fuel tank, and multiplying the detected amount of remaining fuel by a fixed gas mileage to calculate the DTE.

Furthermore, to reflect variation in driving conditions, a method of calculating DTE based on a learning gas mileage, which is calculated as an average gas mileage by accumulating previous driving patterns of a driver, has been currently used.

However, in a case of an autonomous vehicle capable of autonomous driving, there is no alternative but for patterns in variation of learning gas mileages in a driver driving mode and an autonomous driving mode to differ from each other. Therefore, if the driver driving mode and the autonomous driving mode are not separately controlled, the DTE displayed on the cluster of the vehicle differs from real DTE by each driving mode. In this case, the reliability with regard to the displayed DTE for the driver is reduced, whereby the marketability of the vehicle may be deteriorated.

SUMMARY

An embodiment of the present disclosure is directed to an apparatus for dually displaying DTE of an autonomous vehicle capable of autonomous driving which determines a driving mode, calculates DTEs by respective driving modes through separate calculation logics, and separately displays the results of the calculation, thus making it possible for a driver to select the driving mode, thereby enhancing the marketability of the vehicle, and a method therefor.

Other objects and advantages of the present disclosure can be understood by the following description, and become apparent with reference to the embodiments of the present disclosure. Further, it is obvious to those skilled in the art to which the present disclosure pertains that the objects and advantages of the present disclosure can be realized by the means as claimed and combinations thereof.

In accordance with an embodiment of the present disclosure, a method of displaying autonomous driving mode distance to empty (DTE) of a vehicle capable of autonomous driving includes: determining whether a destination is set; reading a preset gas mileage table; calculating in real time an autonomous driving condition factor to the destination; calculating the autonomous driving mode DTE based on the preset gas mileage table and the autonomous driving condition factor; and displaying the calculated autonomous driving mode DTE.

The autonomous driving mode DTE may be calculated on a basis of a current amount of remaining fuel and a predicted learning gas mileage calculated based on the preset gas mileage table and the autonomous driving condition factor.

The method may further include: compensating for the calculated DTE using an accumulated driving learning compensation factor obtained by learning after each autonomous driving.

In accordance with another embodiment of the present disclosure, a method of displaying driver driving mode distance to empty (DTE) and an autonomous driving mode DTE of a vehicle capable of autonomous driving includes: displaying the driver driving mode DTE when the vehicle starts; determining whether a destination is set; calculating the autonomous driving mode DTE when the destination is set; and additionally displaying the calculated autonomous driving mode DTE, wherein a driving mode of the vehicle is allowed to be selected based on the DTEs separately displayed by the driving modes.

The step of calculating the autonomous driving mode DTE may include: reading a preset gas mileage table; calculating in real time an autonomous driving condition factor to the destination; and calculating the autonomous driving mode DTE based on the preset gas mileage table and the autonomous driving condition factor.

The method may further include: compensating for the calculated DTE using an accumulated driving learning compensation factor obtained by learning after each autonomous driving.

The method may further include: renewing an accumulated driving learning compensation factor by learning after driving in an autonomous driving mode is completed.

The driver driving mode DTE may be calculated based both on a fixed gas mileage according to a vehicle type and on an accumulated driver-driving-mode learning gas mileage.

The method may further include, after driving in an autonomous driving mode has been completed, additionally displaying a graph comparing variations of DTEs by the respective driving modes.

The autonomous driving mode DTE may be displayed only when the destination is set.

In accordance with a further embodiment of the present disclosure, an apparatus for dually displaying distance to empties (DTEs) by driving modes of a vehicle capable of autonomous driving includes: an output configured to always display driver driving mode DTE when the vehicle starts; an input configured to input information about a destination; and a calculator configured to calculate the DTEs to be displayed on the output by the respective driving modes, wherein the output additionally displays an autonomous driving mode DTE calculated by the calculator.

The calculators may calculate, when the information about the destination is inputted to the input, an autonomous driving mode DTE based on a preset gas mileage table and an autonomous driving condition factor to the destination which is calculated in real time, and compensate for the calculated autonomous driving mode DTE using an accumulated driving learning compensation factor obtained by learning after each autonomous driving.

The calculator may calculate, when the vehicle starts, the driver driving mode DTE based on a fixed gas mileage according to a vehicle type and an accumulated driver-driving-mode learning gas mileage.

When the information about the destination is inputted, the DTEs by the respective driving modes may be simultaneously displayed to enable a driving mode to be selected.

The output may additionally display a graph comparing variations of DTEs by the respective driving modes after the driving in the autonomous driving mode is completed.

DESCRIPTION OF SPECIFIC EMBODIMENTS

The terms and words used in the specification and claims must not be limited to typical or dictionary meanings, but must be regarded as concepts selected by the inventor as concepts which best illustrate the present disclosure, and must be interpreted as having meanings and concepts adapted to the scope and spirit of the present disclosure to aid in understanding the technology of the present disclosure.

Therefore, the construction of the embodiment illustrated in the specification and the drawings must be regarded as only one illustrative example, and these are not intended to limit the present disclosure. Furthermore, it must be understood that various modifications, additions and substitutions are possible at the point of time of application of the present disclosure. In the following description of the invention, if the related known functions or specific instructions on configuring the gist of the present disclosure unnecessarily obscure the gist of the invention, the detailed description thereof will be omitted. Hereinafter, embodiments of the present disclosure will be described below in more detail with reference to the accompanying drawings so as to be easily realized by those skilled in the art.

Figure 2:
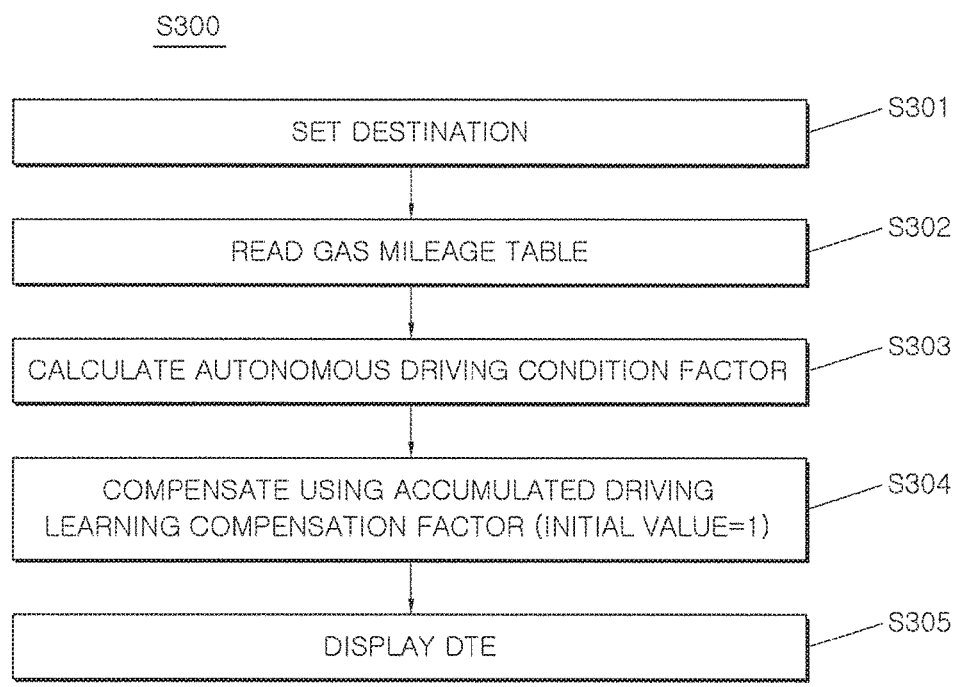
FIG. 2 is a flowchart illustrating a method of displaying DTE in an autonomous driving mode according to another embodiment of the present disclosure.

FIG. 2 is a flowchart illustrating a method of displaying distance to empty (DTE) in an autonomous driving mode according to an embodiment of the present disclosure.

As shown in FIG. 2, the process of displaying the DTE in the autonomous driving mode according to the embodiment of the present disclosure begins from a step S301 of setting a destination. Unlike a driver driving mode, there is always a need to set the destination for autonomous driving.

After the destination has been set by a driver, a gas mileage table which is provided by a vehicle manufacturer and in which various gas mileage values depending on driving conditions are mapped is read, at step S320. In this regard, the gas mileage values may be gas mileage values mapped depending on various driving conditions reflecting major gas mileage factors such as a driving speed, the kind of road, an inclination of the ground, and air pressures of tires, on a 1 km basis, rather than a single fixed gas mileage value provided by the vehicle manufacturer.

Thereafter, an autonomous driving condition factor to the inputted destination is calculated in real time at step S303. Reflecting the major gas mileage factors considered from the read gas mileage table, the autonomous driving condition factor may be calculated using a navigation apparatus, a GPS apparatus and the like of the vehicle based on real-time traffic conditions, a three-dimensional (3D) map, and the like.

After the above-mentioned steps have been performed, a predicted learning gas mileage for the autonomous driving conditions may be calculated by multiplying the mapped gas mileage provided by the vehicle manufacturer by the calculated autonomous driving condition factor.

The calculated predicted learning gas mileage is compensated for by an accumulated driving learning compensation factor, at step S304, to finally calculate a leaning gas mileage in the autonomous driving mode. As will be described later herein, the accumulated driving learning compensation factor may be set to '1' as an initial value thereof and renewed by a driving learning compensation factor calculated by learning after each autonomous driving operation.

The driving learning compensation factor is calculated by an error value obtained by comparing the calculated predicted learning gas mileage with a gas mileage resulted from a real autonomous driving operation.

Eventually, a final learning gas mileage can be calculated by multiplying the mapped gas mileage provided from the vehicle manufacturer by the calculated autonomous driving condition factor and the accumulated driving learning compensation factor.

Figure 3A:
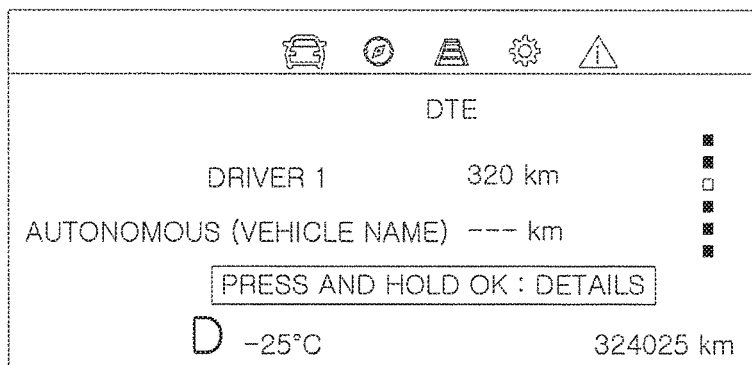
FIGS. 3A and 3B are views schematically illustrating an operating state of an apparatus for dually displaying DTE according to another embodiment of the present disclosure.
Figure 3B:
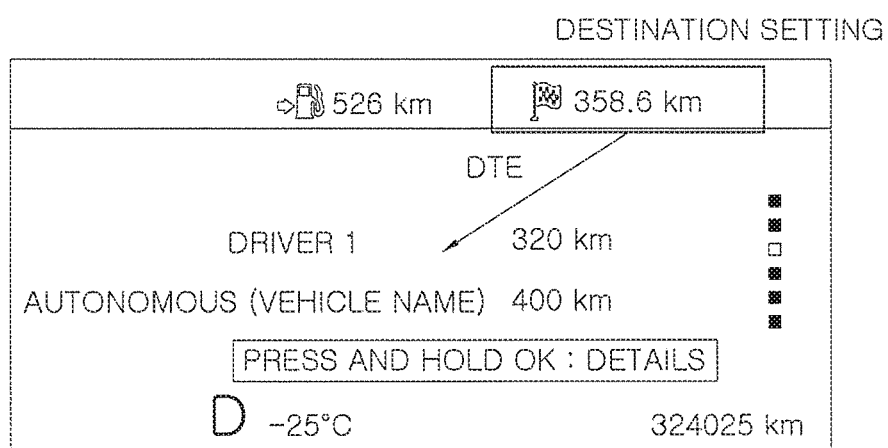

DTE in the autonomous driving mode can be calculated by multiplying a current amount of remaining fuel by the calculated final learning gas mileage for the autonomous driving. As shown in FIG. 3b, the DTE is digitized, and the digitized DTE may be displayed on a display unit such as a cluster of the vehicle, at step S305.

Figure 1:
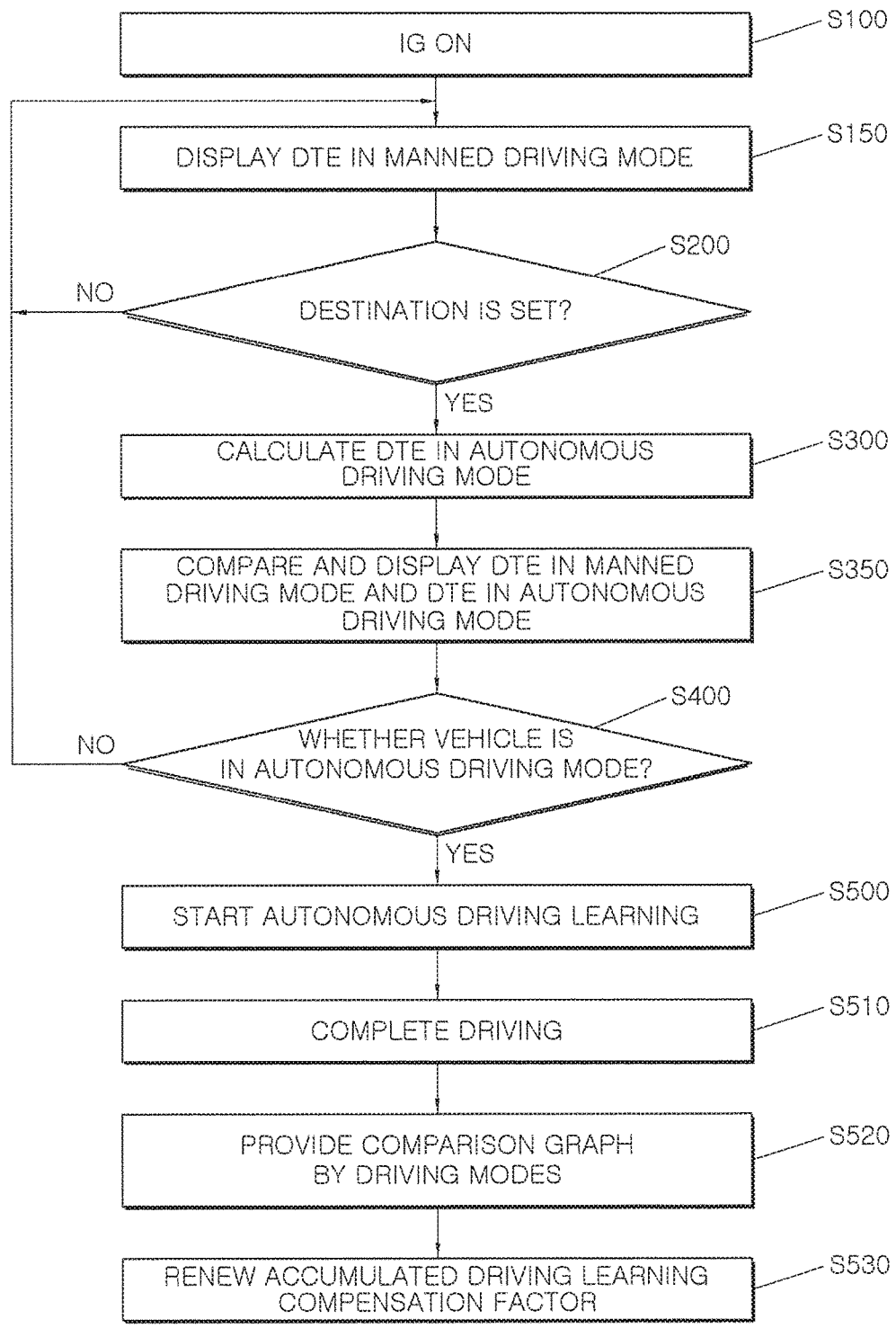
FIG. 1 is a flowchart illustrating a method of dually displaying distance to empty (DTE) according to an embodiment of the present disclosure.

FIG. 1 is a flowchart illustrating a method of dually displaying DTE according to another embodiment of the present disclosure.

As shown in FIG. 1, the process of dually displaying the DTE according to this embodiment of the present disclosure begins from the step S100 of turning on an ignition switch when the driver starts the vehicle.

When the ignition switch of the vehicle is turned on by the driver, the DTE that the vehicle can travel in a driver driving mode may be basically displayed on the display unit such as the cluster of the vehicle, at step S150.

Calculating the driver driving mode DTE may include: calculating an arithmetic average between the single fixed gas mileage value provided from the manufacturer of the corresponding vehicle and an accumulated learning gas mileage value of the driver that is accumulatively operated depending on driving patterns of the driver; and multiplying the arithmetic average as a learning gas mileage by a value obtained by measuring the current amount of remaining fuel.

Furthermore, the leaning gas mileage of the driver driving mode may be accumulatively managed for all situations during the ignition-on state of the vehicle.

For the autonomous driving, destination information must always be provided. For this, the step S200 of determining whether a destination is set is performed. In this regard, the destination information may be inputted through an apparatus interlocking with a trip computer, such as a navigation apparatus, of the vehicle.

If, at step S200, the destination information has been set by the driver, a DTE that the vehicle can travel in the autonomous driving mode is calculated, at step S300.

A method of calculating the autonomous driving mode DTE, as shown in FIG. 2, includes the step S302 of reading the gas mileage table, which is provided by the vehicle manufacturer, and in which various gas mileage values depending on driving conditions are mapped. In this regard, the gas mileage values may be gas mileage values mapped depending on various driving conditions reflecting major fuel efficiency factors such as a driving speed, the kind of road, an inclination of the ground, and air pressures of tires, on a 1 km basis, rather than being a single fixed gas mileage value provided by the vehicle manufacturer.

Thereafter, an autonomous driving condition factor to the inputted destination is calculated in real time at step S303. Reflecting the major fuel efficiency factors considered from the read fuel efficiency table, the autonomous driving condition factor may be calculated using a navigation apparatus, a GPS apparatus and the like of the vehicle based on real-time traffic conditions, a three-dimensional (3D) map, and the like.

After the above-mentioned steps have been performed, a predicted learning gas mileage for the autonomous driving conditions may be calculated by multiplying the mapped gas mileage provided by the vehicle manufacturer by the calculated autonomous driving condition factor.

The calculated predicted learning gas mileage is compensated for by an accumulated driving learning compensation factor, at step S304, to finally calculate a leaning gas mileage in the autonomous driving mode. As will be described later herein, the accumulated driving learning compensation factor may be set to '1' as an initial value thereof and renewed by a driving learning compensation factor calculated by learning after each autonomous driving operation.

The driving learning compensation factor is calculated by an error value obtained by comparing the calculated predicted learning gas mileage with a gas mileage resulted from a real autonomous driving operation.

Eventually, a final learning gas mileage can be calculated by multiplying the mapped gas mileage provided from the vehicle manufacturer by the calculated autonomous driving condition factor and the accumulated driving learning compensation factor.

The DTE in the autonomous driving mode can be calculated by multiplying a current amount of remaining fuel by the calculated final learning gas mileage for the autonomous driving. The DTE is digitized, and the digitized DTE may be displayed on the display unit such as the cluster of the vehicle, at step S305.

When the ignition switch is in the turned-on state, not only the driver driving mode DTE but also the autonomous driving mode DTE is calculated through a separate logic and displayed, thus enabling the driver to select an appropriate driving mode, as needed. Thereby, the marketability of the vehicle can be enhanced.

Thereafter, as shown in FIG. 1, if the driver selects the autonomous driving mode, the autonomous driving operation begins, and simultaneously, a gas mileage pattern learning operation for the autonomous driving operation begins, at step S500.

Figure 4A:
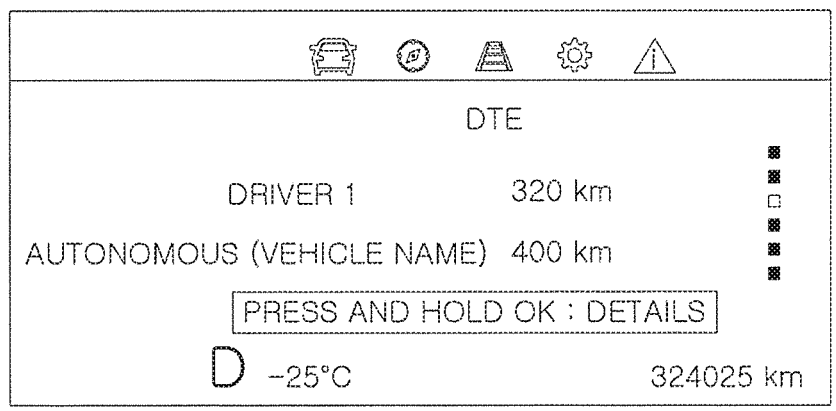
FIGS. 4A and 4B are views schematically illustrating an operating state of a DTE dual-display apparatus to display a graph showing DTE variations by driving modes after an autonomous driving operation, according to another embodiment of the present disclosure.
Figure 4B:
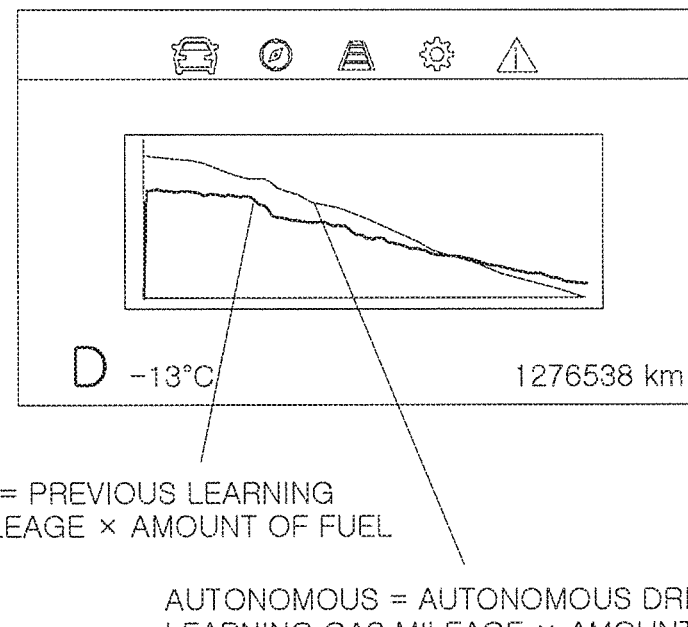

If, at step S510, the autonomous driving operation is completed, as shown in FIG. 4A, variations in DTEs in the autonomous driving mode and the driver driving mode during a driving process to the destination set depending on selection of the driver may be compared and, as shown in FIG. 4B, visually displayed in the form of a graph, at step S520.

That is, the variation of the driver driving mode DTE may be obtained by multiplying a gas mileage value learned during a preceding driver driving operation by the amount of remaining fuel and be displayed. The variation of the autonomous driving mode DTE may be obtained by multiplying a gas mileage value learned during the corresponding autonomous driving operation by the amount of remaining fuel and be displayed.

Furthermore, after the autonomous driving operation is completed, the gas mileage value predicted before the driving operation and real gas mileage data for each section are compared with each other, and an error value obtained as the result of the comparison is used as a driving learning compensation factor by which the accumulated driving learning compensation factor is renewed, at step S530.

That is, at step S300 of calculating the autonomous mode DYE, the learning gas mileage value predicted before the driving operation is compensated for by the accumulated driving learning compensation factor that is renewed each time.

Figure 5:
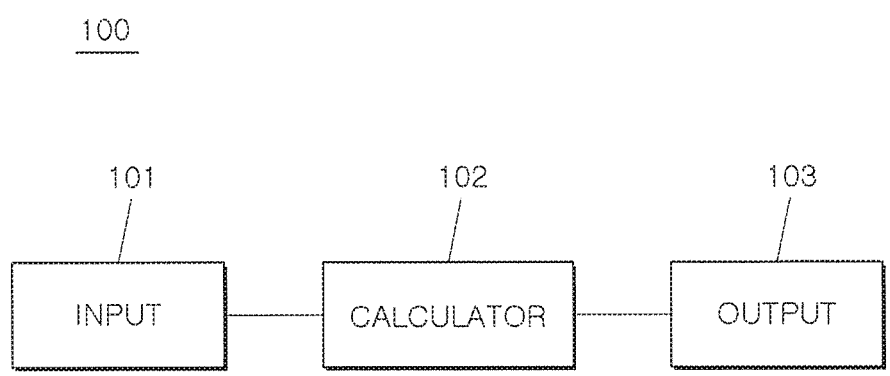
FIG. 5 is a block diagram illustrating the configuration of a DTE dual-display apparatus according to another embodiment of the present disclosure.

FIG. 5 is a block diagram illustrating the configuration of a DTE dual-display apparatus according to another embodiment of the present disclosure.

As shown in FIG. 5, the DTE dual-display apparatus according to this embodiment of the present disclosure includes an input 101 which receives information about a destination set by the driver, a calculator 102 which calculates DTEs by driving modes, and an output 103 which digitizes the calculated DTEs and displays the DTEs.

The output 103 always displays driver driving mode DTE when the vehicle starts (ignition on).

Furthermore, when the destination information is inputted through the input 101, the output 103 may additionally display an autonomous DTE calculated by the calculator 102.

Therefore, the driver may compare the DTEs by the driving modes that are displayed on the output 103, and select an appropriate driving mode as needed.

The calculator 102 calculates, when the destination information is inputted, a predicted learning gas mileage in the autonomous mode by multiplying a mapped gas mileage depending on driving conditions provided from the vehicle manufacturer by an autonomous driving condition factor to the destination calculated in real time. A final learning gas mileage is calculated by compensating for the predicted learning gas mileage using an accumulated driving learning compensation factor that is renewed by learning after each autonomous driving operation. The autonomous driving mode DTE is calculated by multiplying the final learning gas mileage by a current amount of remaining fuel.

Furthermore, even if there is no input of destination information, the calculator 102 calculates, when the vehicle starts (ignition on), the driver driving mode DTE and displays it on the output 103.

In this regard, the driver driving mode DTE is calculated by multiplying an average between a fixed gas mileage according to a vehicle type and the accumulated learning gas mileage of the driver driving mode by the current amount of remaining fuel.

The output 103 may additionally display, after driving in the autonomous driving mode has been completed, a graph comparing variations of DTEs by the respective driving modes. Furthermore, a driving leaning compensation factor is calculated based on a learning value in autonomous driving, whereby an accumulated driving learning compensation factor is renewed (the initial value thereof may be set to '1').

The various embodiments disclosed herein, including embodiments of the DTE dual-display apparatus and/or elements thereof, can be implemented using one or more processors coupled to a memory (or other non-transitory machine readable recording medium) storing computer-executable instructions for causing the processor(s) to perform the functions described above including the functions described in relation to the input 101, the calculator 102, and the output 103.

As described above, in embodiments of the present disclosure, DTEs in a driver driving mode and an autonomous driving mode are controlled by separate logics and are separately displayed, thus allowing a driver to select the driving mode as needed.

Furthermore, because an autonomous driving vehicle is operated in a driving pattern to be precisely controlled according to set environment values, a learning gas mileage can be precisely calculated by renewing a driving learning compensation factor calculated through autonomous driving learning.

As described above, an apparatus for dually displaying a DTE of an autonomous vehicle according to the present disclosure determines a driving mode, calculates DTEs by respective driving modes through separate calculation logics, and visually displays the results of the calculation, thus making it possible for a driver to select the driving mode. Thereby, the marketability of the vehicle can be enhanced.

Although the specific embodiments of the present disclosure have been disclosed, they are only examples of the present disclosure to allow one having ordinary skill in the art (hereinafter, referred to as a 'skilled person') to easily implement the present disclosure. Therefore, the bounds of the present disclosure are not limited to the embodiments. The skilled person will appreciate that various modifications and changes are possible without departing from the technical spirit of the invention, and those modifications and changes belong to the scope of the accompanying claims.

What is claimed is:

1. A method of displaying driver driving mode distance to empty (DTE) and an autonomous driving mode DTE of a vehicle capable of autonomous driving, the method comprising steps of:
   displaying the driver driving mode DTE when the vehicle starts;
   determining whether a destination is set;
   calculating the autonomous driving mode DTE when the destination is set; and
   additionally displaying the calculated autonomous driving mode DTE,
   wherein a driving mode of the vehicle is allowed to be selected based on the DTEs separately displayed by the driving modes.

2. The method of claim 1, wherein the step of calculating the autonomous driving mode DTE comprises:
   reading a preset gas mileage table;
   calculating, in real time, an autonomous driving condition factor to the destination; and
   calculating the autonomous driving mode DTE based on the preset gas mileage table and the autonomous driving condition factor.

3. The method of claim 2, further comprising:
   compensating for the calculated DTE using an accumulated driving learning compensation factor obtained by learning after each autonomous driving.

4. The method of claim 1, further comprising:
   renewing an accumulated driving learning compensation factor by learning after driving in an autonomous driving mode is completed.

5. The method of claim 1, wherein the driver driving mode DTE is calculated based both on a fixed gas mileage according to a vehicle type and on an accumulated driver-driving-mode learning gas mileage.

6. The method of claim 1, further comprising, after driving in an autonomous driving mode is completed:
   additionally displaying a graph comparing variations of DTEs by the respective driving modes.

7. The method of claim 1, wherein the autonomous driving mode DTE is displayed only when the destination is set.

8. An apparatus for dually displaying distance to empty (DTE) by driving modes of a vehicle capable of autonomous driving, the apparatus comprising:
   an output configured to always display driver driving mode DTE when the vehicle starts;
   an input configured to input information about a destination; and
   a calculator configured to calculate the dual DTE to be displayed on the output by the respective driving modes,
   wherein the output additionally displays autonomous driving mode DTE calculated by the calculator.

9. The apparatus of claim 8, wherein the calculator calculates, when the information about the destination is inputted to the input, the autonomous driving mode DTE based on a preset gas mileage table and an autonomous driving condition factor to the destination which is calculated in real time, and compensates for the calculated autonomous driving mode DTE using an accumulated driving learning compensation factor obtained by learning after autonomous driving.

10. The apparatus of claim 8, wherein the calculator calculates, when the vehicle starts, the driver driving mode DTE based on a fixed gas mileage according to a vehicle type and an accumulated driver-driving-mode learning gas mileage.

11. The apparatus of claim 8, wherein, when the information about the destination is inputted, the dual DTE by the respective driving modes are simultaneously displayed to select a driving mode.

12. The apparatus of claim 8, wherein the output additionally displays a graph comparing variations of the dual DTE by the respective driving modes after the autonomous driving is completed.

* * * * *